US011105354B2

(12) United States Patent
Bidlake et al.

(10) Patent No.: US 11,105,354 B2
(45) Date of Patent: Aug. 31, 2021

(54) FASTENING CLIP

(71) Applicant: ILLINOIS TOOL WORKS INC., Glenview, IL (US)

(72) Inventors: Christopher F. Bidlake, Birmingham, MI (US); Alexander W. Sherrill, Hendersonville, TN (US); Jason T. Spain, Hendersonville, TN (US); Gregory G. Buczynski, Ferndale, MI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 15/930,641

(22) Filed: May 13, 2020

(65) Prior Publication Data

US 2020/0271147 A1 Aug. 27, 2020

Related U.S. Application Data

(63) Continuation of application No. 16/079,228, filed as application No. PCT/US2017/013732 on Jan. 17, 2017, now Pat. No. 10,677,277.

(Continued)

(51) Int. Cl.
*F16B 2/24* (2006.01)
*F16B 5/06* (2006.01)
(Continued)

(52) U.S. Cl.
CPC ............ *F16B 5/0614* (2013.01); *F16B 2/243* (2013.01); *F16B 2/245* (2013.01); *F16B 21/075* (2013.01); *F16B 21/086* (2013.01); *Y10T 24/307* (2015.01)

(58) Field of Classification Search
CPC .... F16B 5/0657; F16B 5/0614; F16B 21/075; F16B 21/086; F16B 2/243; F16B 2/245; Y10T 24/307
See application file for complete search history.

(56) References Cited

U.S. PATENT DOCUMENTS 6,796,006 B2   9/2004  Hansen
7,640,634 B2   1/2010  Vassiliou
(Continued)

FOREIGN PATENT DOCUMENTS

CN   101205943 A   6/2008
CN   102016333 A   4/2011
(Continued)

OTHER PUBLICATIONS

International Search Report and Written Opinion for PCT/US2017/013732.
(Continued)

*Primary Examiner* — Robert Sandy
*Assistant Examiner* — Michael S Lee
(74) *Attorney, Agent, or Firm* — Quarles & Brady LLP

(57) ABSTRACT

A fastening clip is configured to securely couple a first component to a second component. The fastening clip includes a first frame connected to an opposed second frame by an arcuate transition beam. Each of the first and second frames includes an exterior contact finger that is configured to securely abut into a first outer surface of the first component around at least a portion of a first opening formed through the first component, an interior contact finger that is configured to extend into the first opening, and a contact prong that is configured to abut into a second outer surface of the first component.

19 Claims, 5 Drawing Sheets

Related U.S. Application Data

(60) Provisional application No. 62/311,534, filed on Mar. 22, 2016.

(51) Int. Cl.
*F16B 21/07* (2006.01)
*F16B 21/08* (2006.01)

(56) References Cited

U.S. PATENT DOCUMENTS

| | | |
|---|---|---|
| 2003/0233738 A1 | 12/2003 | Osterland et al. |
| 2008/0028577 A1 | 2/2008 | Soman et al. |
| 2011/0209309 A1* | 9/2011 | Camus ............... F16B 19/1081 24/458 |
| 2013/0340216 A1 | 12/2013 | Smith et al. |

FOREIGN PATENT DOCUMENTS

| | | |
|---|---|---|
| DE | 202012007754 U1 | 9/2012 |
| EP | 1482184 A2 | 12/2004 |
| FR | 2959537 A1 | 11/2011 |
| WO | 0303100267 A1 | 4/2003 |

OTHER PUBLICATIONS

Office Action for Chinese Patent Application No. 20178001737.X, dated Dec. 18, 2019. (5 pages).

* cited by examiner

FASTENING CLIP

CROSS-REFERENCE TO RELATED APPLICATIONS

This application is a continuation of U.S. patent application Ser. No. 16/079,228, filed on Aug. 23, 2018, and entitled "Fastening Clip," which represents the national stage filing of International Patent Application No. PCT/US2017/013732, filed on Jan. 17, 2017, which relates to and claims priority to U.S. Provisional Patent Application No. 62/311,534, filed Mar. 22, 2016, and entitled "Fastening Clip," which are hereby incorporated by reference in their entirety.

FIELD OF EMBODIMENTS OF THE DISCLOSURE

Embodiments generally relate to fastener assemblies, and, more particularly to fastening clips that are configured to connect components together.

BACKGROUND

Various components are secured together through fasteners. For example, panels, sheets, frames, and the like may be secured together through fastener assemblies that include a male fastening member that securely mates with a female fastening member. As another example, a clip may be used to secure two or more components together.

U.S. Pat. No. 6,796,006, entitled "Rib Clip" discloses a rib clip. U.S. Pat. No. 7,640,634, entitled "Ergonomic Fastener" discloses a clip fastener.

Certain known clip fasteners connect to ribs through barb retainers. A known clip fastener includes sharp corners on tabs that are configured to resist undesired extraction. For example, the sharp tabs dig into a portion of a component, thereby anchoring the clip fastener to the component. However, it has been found that the barb retainers and sharp corners may undesirably affect certain components. For example, the sharp corners on tabs may cut into plastic components. As such, outer surfaces of the components may be cut or otherwise marred by certain types of clip fasteners. Further, the interaction of the sharp corners with the component may prevent the component from being used after the fastener clip is removed therefrom.

SUMMARY OF EMBODIMENTS OF THE DISCLOSURE

A need exists for a fastening clip that securely and efficiently connects to one or more components. A need exists for a fastening clip that is able to resist extraction without undesirably affecting a component.

With those needs in mind, certain embodiments of the present disclosure provide a fastening clip that is configured to securely connect a first component to a second component. The fastening clip includes a first frame connected to an opposed second frame by an arcuate transition beam. Each of the first and second frames includes an exterior contact finger that is configured to securely abut into a first outer surface of the first component around at least a portion of a first opening formed through the first component, an interior contact finger that is configured to extend into the first opening, and a contact prong that is configured to abut into a second outer surface of the first component. The first and second frames may be configured to secure within a second opening of the second component.

In at least one embodiment, the fastening clip is configured to securely couple to the first component to form a sub-assembly. The sub-assembly is configured to be securely coupled to the second component to form an assembly.

Each of the first and second frames may also include lateral legs that outwardly and upwardly flare from the transition beam. In at least one embodiment, each of the exterior contact finger, the interior contact finger, and the contact prong are between the lateral legs. Each of the lateral legs may outwardly flare from the arcuate transition beam.

In at least one embodiment, each of the first and second frames further includes an arcuate bend connected to a coupling tab. The arcuate bend inwardly directs the coupling tab towards a central longitudinal plane of the fastening clip. The coupling tabs of the first and second frames may define a V-shaped passage that is configured to receive the first component. The coupling tab may include an outwardly-flared end.

Each of the first and second frames may also include a central beam extending from the coupling tab. In at least one embodiment, the exterior and interior contact fingers extend from the central beam.

In at least one embodiment, the exterior contact finger extends away from a central longitudinal plane of the fastening clip, and the interior contact finger extends towards the central longitudinal plane. The exterior contact finger may be split away from the interior contact finger. In at least one embodiment, the exterior contact finger and the interior contact finger of the first frame are inverted with respect to the exterior contact finger and the interior contact finger of the second frame.

The contact prong of the first frame may structurally mirror the contact prong of the second frame. In at least one embodiment, the contact prong includes an outwardly-flared end tab.

In at least one embodiment, the exterior contact finger of the first frame is configured to contact the first component at a first location. The exterior contact finger of the second frame is configured to contact the first component at a second location. The interior contact finger of the first frame is configured to contact the first component at a third location. The interior contact finger of the second frame is configured to contact the first component at a fourth location. The contact prong of the first frame is configured to contact the first component at a fifth location. The contact prong of the second frame is configured to contact the first component at a sixth location. The first, second, third, fourth, fifth, and sixth locations differ from one another.

Certain embodiments of the present disclosure provide an assembly that includes a first component defining a first opening, a second component defining a second opening, and a fastening clip that securely couples to the first component to form a sub-assembly that securely couples to the second component to form the assembly. The fastening clip includes a first frame connected to an opposed second frame by an arcuate transition beam.

Figure 1:
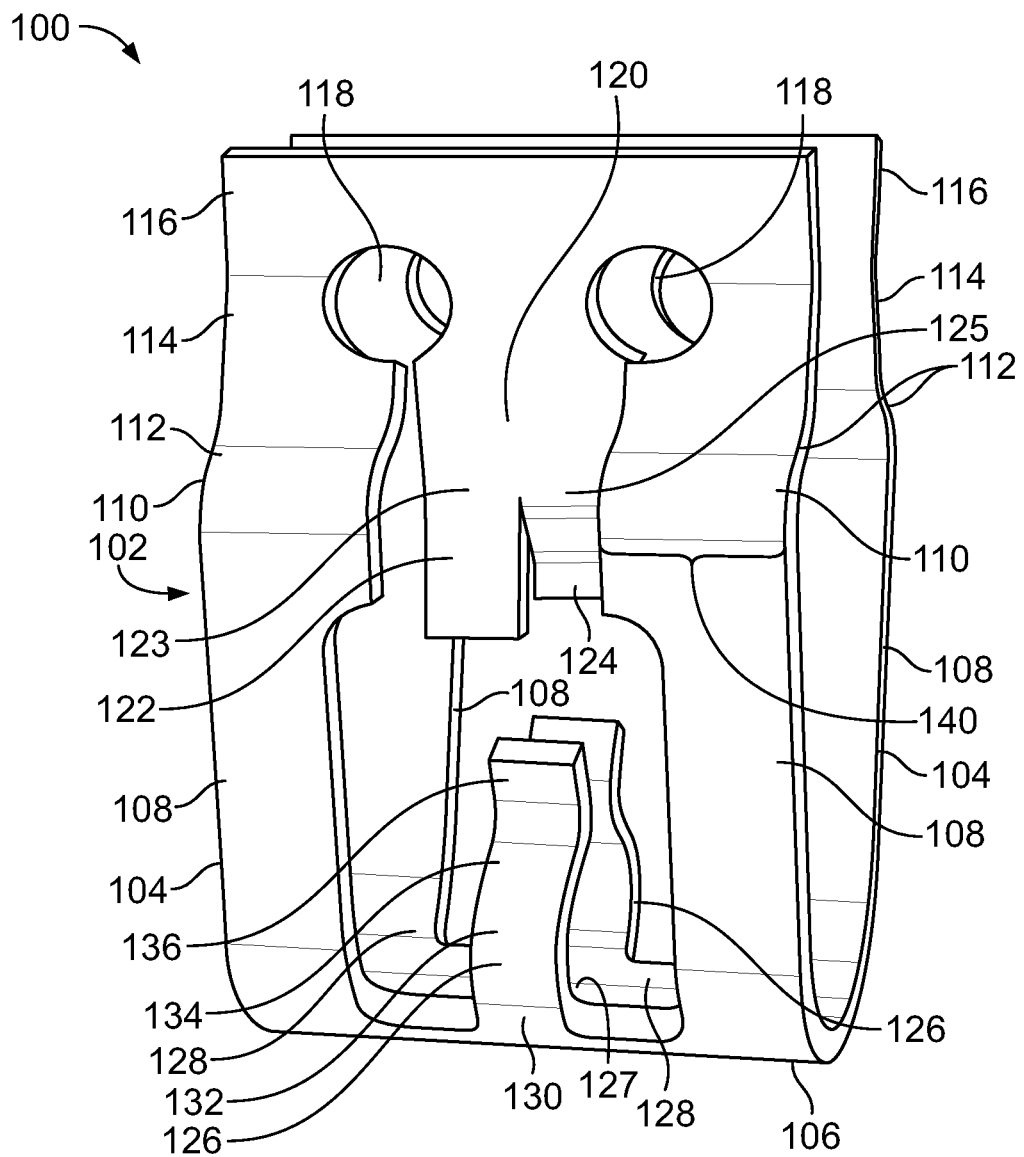
FIG. 1 illustrates a perspective front view of a fastening clip, according to an embodiment of the present disclosure.

Before the embodiments of the disclosure are explained in detail, it is to be understood that the disclosure is not limited in its application to the details of construction and the arrangement of the components set forth in the following description or illustrated in the drawings. The disclosure is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF EMBODIMENTS OF THE DISCLOSURE

Embodiments of the present disclosure provide a fastening clip that is configured to securely join first and second components together. The fastening clip may be formed of metal. One of the first or second components may be or include a panel or rib structure that may be formed of a thermoplastic material. The other of the first or second components may include a rectangular opening that may be formed of thermoplastic material, and which provides a relatively low insertion effort for ergonomics and effectively resists undesired extraction.

The fastening clip may be formed from a uniform strip of metal (such as steel) through trimming, bending, and forming processes. It has been found that the fastening clip maintains connection with the component(s) during extractions, sustains multiple installation and extractions, and maintains structural integrity during uneven loading and angled extractions.

In order to secure the fastening clip to the components, the fastening clip may first be secured to a first or base panel (that is, a first component) to form a pre-assembly. Such a process may be performed by a supplier to an original equipment manufacturer. The process may be repeated multiple times per component to prepare multiple fastening points.

Next, the pre-assembly is positioned relative to another component (that is, the second component), which may include at least one opening (such as one or more rectangular openings). The pre-assembly is then urged towards the second component in an axial direction such that the opening engages with the clip and the rib structure providing a retention force having a substantially higher extraction force than installation force.

FIG. 1 illustrates a perspective front view of a fastening clip 100, according to an embodiment of the present disclosure. The fastening clip 100 includes a main body 102 that includes opposed frames 104 connected together by an arcuate transition beam 106. The transition beam 106 is curved and is configured to allow the opposed frames to deflect toward and away from one another. Each frame 104 includes lateral legs 108 that outwardly and upwardly flare from the transition beam 106. An end 110 of each leg integrally connects to an inwardly curved bend 112 that curves toward a central longitudinal plane of the fastening clip 100. The bends 112 integrally connect to a coupling tab 114, which includes a distal outwardly-flared end 116.

One or more openings 118 may be formed in each coupling tab 114. The openings 118 reduce the material used to form the fastening clip 100, and provide flexibility and resiliency to the coupling tabs 114. The fastening clip 100 may include more or less openings 118 than shown. In at least one embodiment, the coupling tabs 114 may not include the openings 118.

A central beam 120 extends downwardly from each coupling tab 114. The central beam 120 may downwardly cant (that is, from an upper end towards a lower end) towards the central longitudinal plane of the fastening clip 100.

A first contact finger 122 extends downwardly from a lower end side 123 of the central beam 120, while a second contact finger 124 extends downwardly from an opposite lower end side 125 of the central beam 120. The contact fingers 122 and 124 are split in relation to one another. The contact fingers 122 are bent or angled in opposite directions, such that the first contact finger 122 extends in an outward direction in relation to the inwardly-directed second contact finger 124. In at least one embodiment, the contact fingers 122 and 124 of one frame 104 are inverted from the opposed frame 104, such that the contact finger 122 of the one frame 104 is axially aligned with the contact finger 124 of the opposed frame 104, and vice versa.

Mirror image contact prongs 126 (that is, the opposite contact prongs structurally mirror one another) extend upwardly from the transition beam 106 between the lateral legs 108. For example, the contact prongs 126 extend from a central portion 127 of the transition beam 106, while the lateral legs 108 are laterally offset from the central portion 127 of the transition beam 106. The prongs 126 are separated from the lateral legs 108 by spaces 128.

Each prong 126 includes an outwardly-bowed lower beam 130 that outwardly and upwardly extends from the transition beam 106. The lower beam 130 integrally connects to an extension beam 132, which may inwardly and upwardly cant from the lower beam 130. The extension beam 132, in turn, integrally connects to an inwardly canted beam 134, which, in turn, integrally connects to an outwardly-flared end tab 136.

In operation, the fastening clip 100 is configured to securely couple to first and second components to form an assembly. The split contact fingers 122 and 124 are configured to couple to and/or around a central opening (such as a center rib opening) of a first component to transfer load therewith. The offset, split nature of the contact fingers 122 and 124 also maintains alignment between the first component and the fastening clip 100 as the first component is securely coupled to the fastening clip 100.

The split nature of the contact fingers 122 and 124 ensures that the contact fingers 122 and 124 are positioned within opposite sides or otherwise about an opening of the first component. In this manner, the split contact fingers 122 and 124 ensure that the fastening clip 100 is secured to the first component in a stable orientation and position when uneven loads are exerted into the first component and/or the fastening clip 100.

The inward bends 112 increase retention force of the coupling tabs 114 with respect to the first component. That is, the inward bends 112 increase a compressive force of the coupling tabs 114 into the first component, thereby increasing the amount of force needed to extract the first component from the fastening clip 100. Consequently, the fastening clip 100 provides a stronger, more robust connection with the first component and the fastening clip 100.

Each leg 108 may include an expanded upper portion 140 proximate to the bend 112. The expanded upper portion 140 provides a wider contact area proximate to the bend 112, which limits stress on components to which the fastening clip 100 couples, and provides a more resilient and stronger fastening clip 100.

The outwardly-flared end tabs 136 allow the prongs 128 to smoothly couple to the first component. Because the end tabs 136 are outwardly flared, the prongs 128 are less susceptible to digging, cutting, or otherwise marring the first component. The opposed, mirror image prongs 128 are configured to maintain contact with the first component to prevent rattling and maintain a secure, axially aligned connection with the first component.

Figure 2:
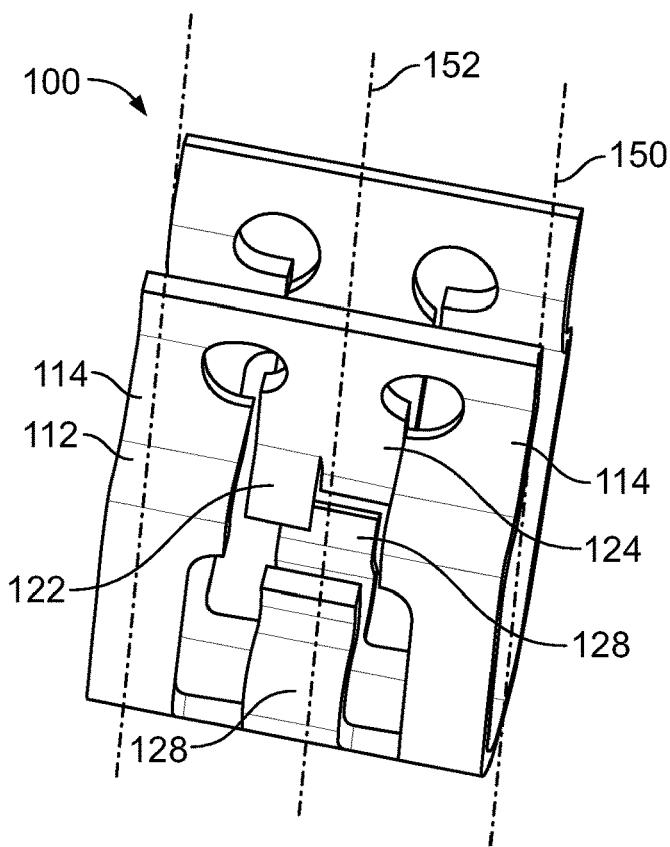
FIG. 2 illustrates a perspective front top view of a fastening clip, according to an embodiment of the present disclosure.

FIG. 2 illustrates a perspective front top view of the fastening clip 100. The prongs 128 are mirror images of one another on opposite sides of the central longitudinal plane 150 of the fastening clip 100. The prongs 128 are generally aligned with respect to a central longitudinal axis 152 of the fastening clip 100. For example, the prongs 128 may be linearly aligned with a central lateral plane that is orthogonal to the central longitudinal plane 150.

Figure 3:
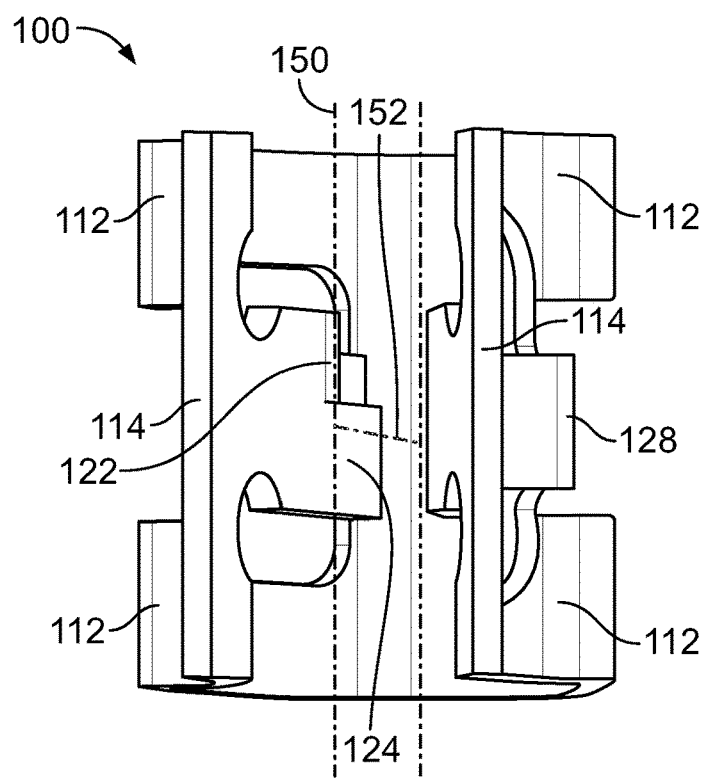
FIG. 3 illustrates a perspective top view of a fastening clip, according to an embodiment of the present disclosure.

FIG. 3 illustrates a perspective top view of the fastening clip 100. Referring to FIGS. 2 and 3, the inward bends 112 inwardly direct the coupling tabs 114 towards the central longitudinal plane 150. The contact fingers 122 and 124 may be split in relation to one another, such that the contact finger 124 extends towards the central longitudinal plane 150, while the contact finger 122 extends away from (or is parallel with) the central longitudinal plane 150.

Figure 4:
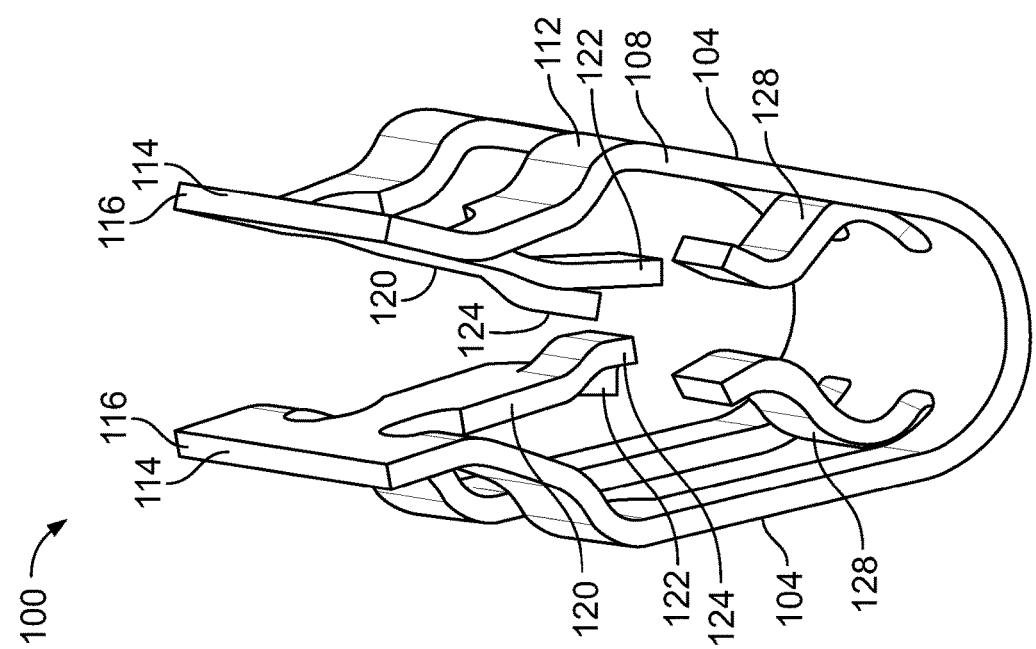
FIG. 4 illustrates a perspective lateral top view of a fastening clip, according to an embodiment of the present disclosure.

FIG. 4 illustrates a perspective lateral top view of the fastening clip 100.

Figure 5:
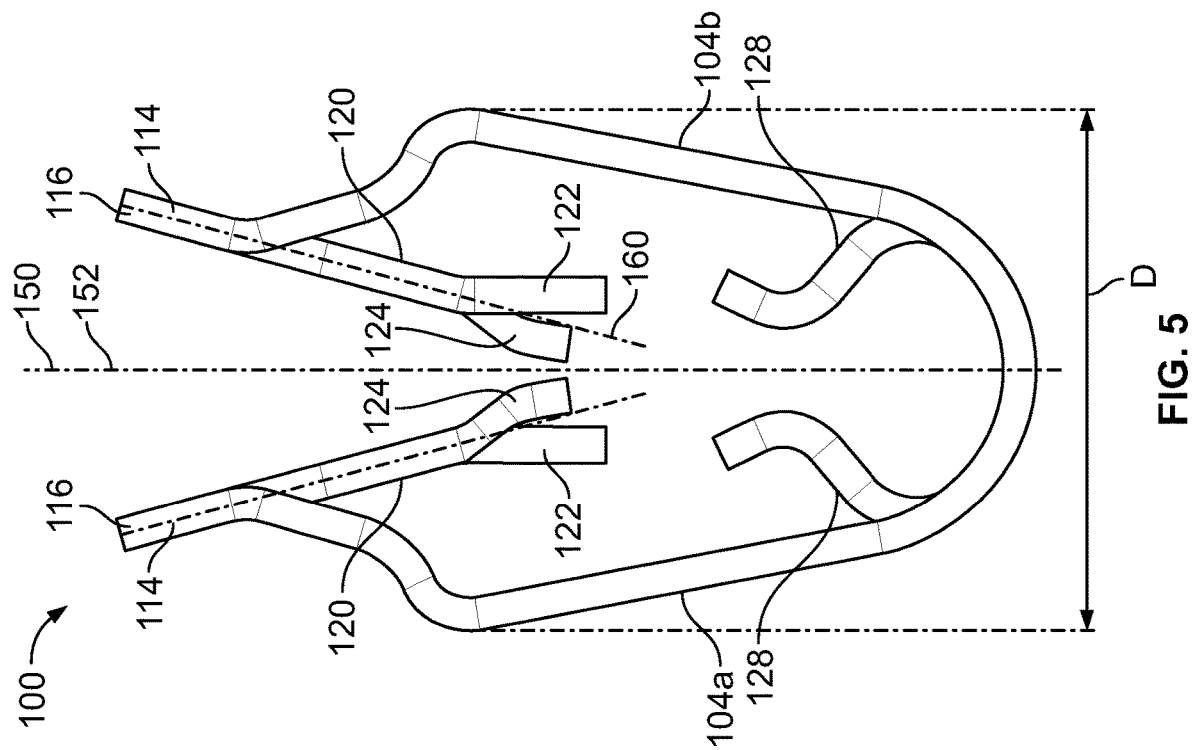
FIG. 5 illustrates a lateral view of a fastening clip, according to an embodiment of the present disclosure.

FIG. 5 illustrates a lateral view of the fastening clip 100. Referring to FIGS. 4 and 5, the outwardly-flared end 116 of the coupling tab 114 and the central beam 120 of each frame 104 may be aligned with respect to a common plane, such that the end 116 and the central beam 120 are coplanar with one another. In this manner, the coupling tabs 114 of the opposed frames 104 provide a V-shaped passage 160, into which a component may be easily and safely inserted. The V-shaped passage 160 also redirects load from an opening formed in the first component, such as a rectangular opening of a rib panel.

The opposed central beams 120 downwardly angle towards the central longitudinal plane 150, and therefore provide a lateral and axial constraint with respect to the first component. As such, the central beams 120 increase retention force in relation to the first component.

A maximum depth (or width) D of the fastening clip, as defined between the opposed transitions between the legs 108 and the bends 112, is configured to provide an interference with respect to a second component, which defines an installation/extraction force ratio. It has been found that the interference with the second component, combined with the inwardly-directed bends 112, significantly increases a load-carrying capacity of the fastening clip 100.

As indicated, the opposed prongs 128 are mirror images to one another on opposite sides of the central longitudinal axis 150. The prongs 128 are configured to provide a desired interference with the first component, limit rattling, and maintaining ergonomic installation effort.

As shown, the first contact fingers 122 may cant away from the central longitudinal axis 150, while the second contact fingers 124 extend (such as bending or curving) towards the central longitudinal axis 150. In at least one embodiment, the contact fingers 122 and 124 of one frame 104a are inverted with respect to the contact fingers 122 and 124 of the opposite frame 104b. For example, the contact finger 122 of the frame 104a may be axially aligned with the contact finger 124 (such that the contact finger 122 extends away from the opposed contact finger 124, which extends towards the contact finger 122) of the frame 104b, and vice versa. In this manner, the contact fingers 122 and 124 of the frames 104a and 104b are configured to cooperate to couple into and around an opening of the first component at four distinct points.

The first contact fingers 122 may extend lower than the second contact fingers 124. The first contact fingers 122 provide exterior contact fingers that are configured to extend over an outer surface of a first component proximate to an opening, while the second contact fingers 124 provide interior contact fingers that are configured to extend into the opening of the first component. Because the second contact fingers 124 of the frame 104a are inverted in relation to the second contact fingers 124 of the frame 104b, the second contact fingers 124 of the frames 104a and 104b do not interfere with one another in relation to the an opening of the first component.

Figure 6:
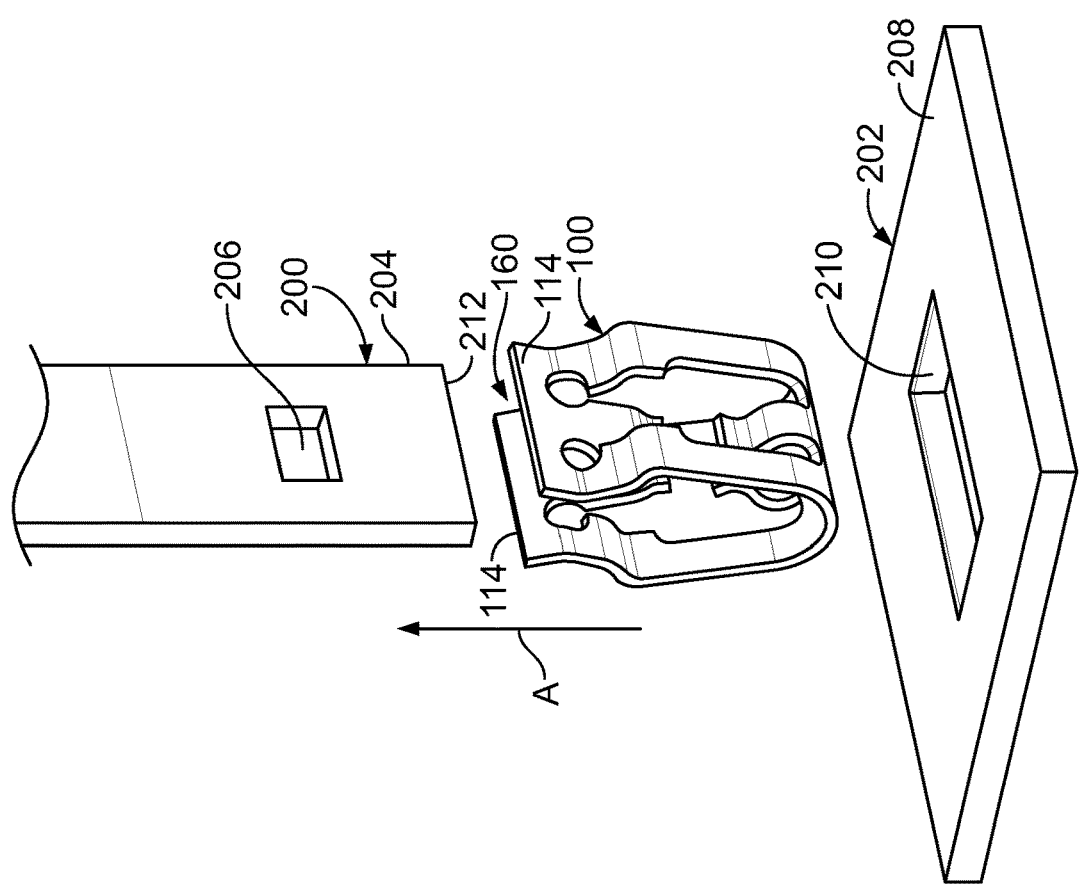
FIG. 6 illustrates a perspective front view of a fastening clip separated from a first component and a second component, according to an embodiment of the present disclosure.

FIG. 6 illustrates a perspective front view of the fastening clip TOO separated from a first component 200 and a second component 202, according to an embodiment of the present disclosure. The first component 200 may be a rib panel including a planar main body 204. A rectangular opening 206 is formed through the main body 204. The second component 202 includes a planar main body 208, with a rectangular opening 210 formed therethrough.

As shown in FIG. 6, the first component 200 is vertically oriented, while the second component 202 is horizontally oriented. Optionally, the orientations of the first and second components 200 and 202 may be different than shown. The fastening clip 100 is configured to orthogonally and securely couple the first component 200 to the second component 202.

In order to secure the first and second components 200 and 202 together, the fastening clip 100 is urged onto the first component 200 in the direction of arrow A. Optionally, the first component 200 may be urged towards the fastening clip 100 in a direction that is opposite to arrow A. As the fastening clip 100 is urged onto the first component 200, a lower end 212 passes into the V-shaped passages between the coupling tabs 114. The outwardly-flared ends 116 ensure that the coupling tabs 114 do not snag the first component 200.

Figure 7:
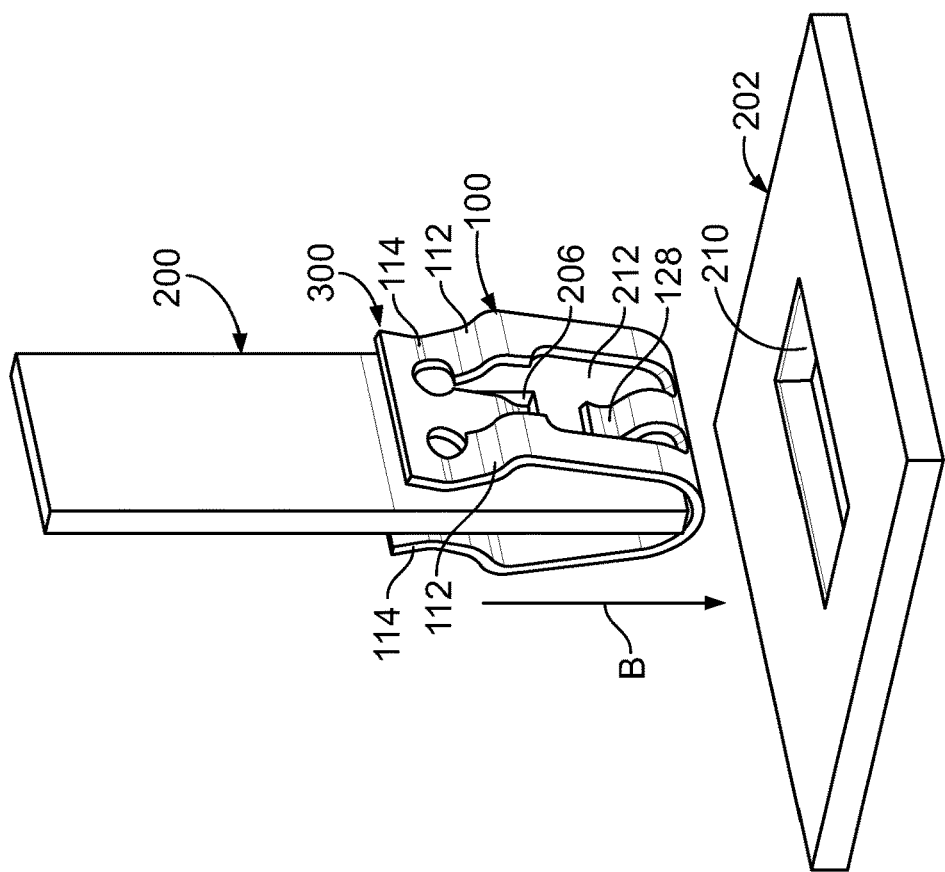
FIG. 7 illustrates a perspective front view of a fastening clip secured to a first component forming a sub-assembly that is separated from a second component, according to an embodiment of the present disclosure.

FIG. 7 illustrates a perspective front view of the fastening clip 100 secured to the first component 200 forming a sub-assembly 300 that is separated from the second component 202, according to an embodiment of the present disclosure. The interior second contact fingers 124 (shown in FIGS. 1-5) extend into the opening 206 at two different locations, while the exterior first contact fingers 122 (shown in FIG. 105) abut into outer surfaces of the first component 200 around the opening 206 (on opposite surfaces of the first component 200), thereby securely locking the fastening clip 100 to the first component 200. The opposed prongs 128 compressively engage the lower end 212 of the first component 200, thereby providing increased retaining strength. A portion of the lower end 212 is compressively sandwiched between the opposed prongs 128. Further, the inward bends 112 cause the tabs 114 to compressively engage a portion of the first component 200 above the opening 206, thereby providing increased retaining strength.

In order to secure the sub-assembly 300 to the second component 202, the transition beam 106 is aligned with the opening 210 of the second component 202. The sub-assembly 300 is then urged into the opening 210 in the direction of arrow B. Optionally, the second component 202 may be urged toward the sub-assembly 300 in an opposite direction.

Figure 8:
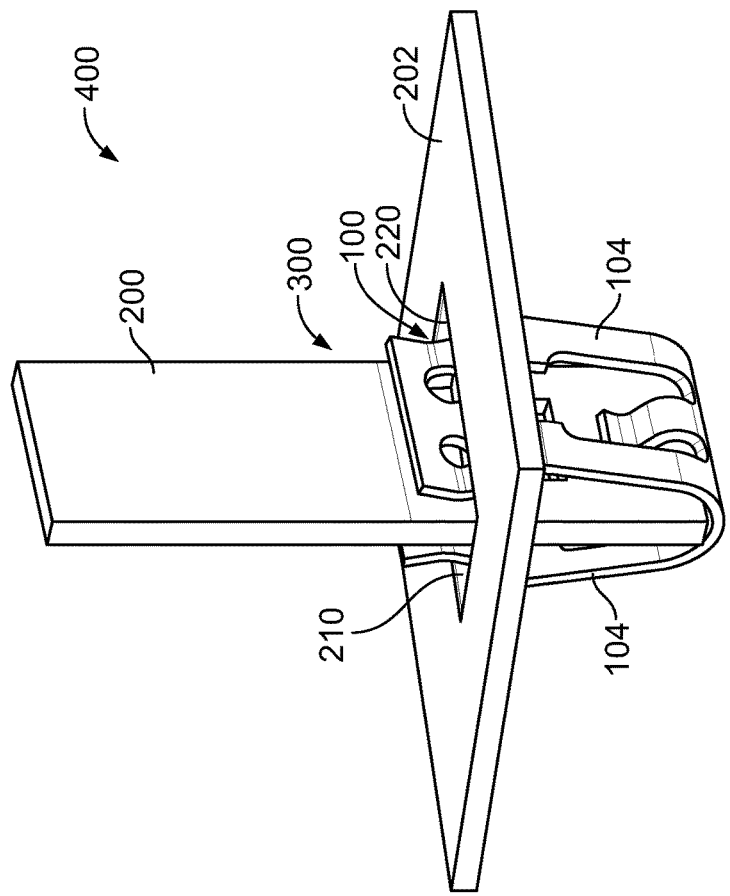
FIG. 8 illustrates a perspective front view of a fastening clip secured to a first component and a second component forming an assembly, according to an embodiment of the present disclosure.

FIG. 8 illustrates a perspective front view of the fastening clip 100 secured to the first component 200 and the second component 202 forming an assembly 400, according to an embodiment of the present disclosure. As the sub-assembly 300 is inserted into the second component 202, the interior edges 220 of the second component 202 that define the opening 210 may inwardly squeeze the opposed frames 104 towards one another, thereby providing a secure interference coupling between the fastening clip 100 and the second component 202.

Figure 9:
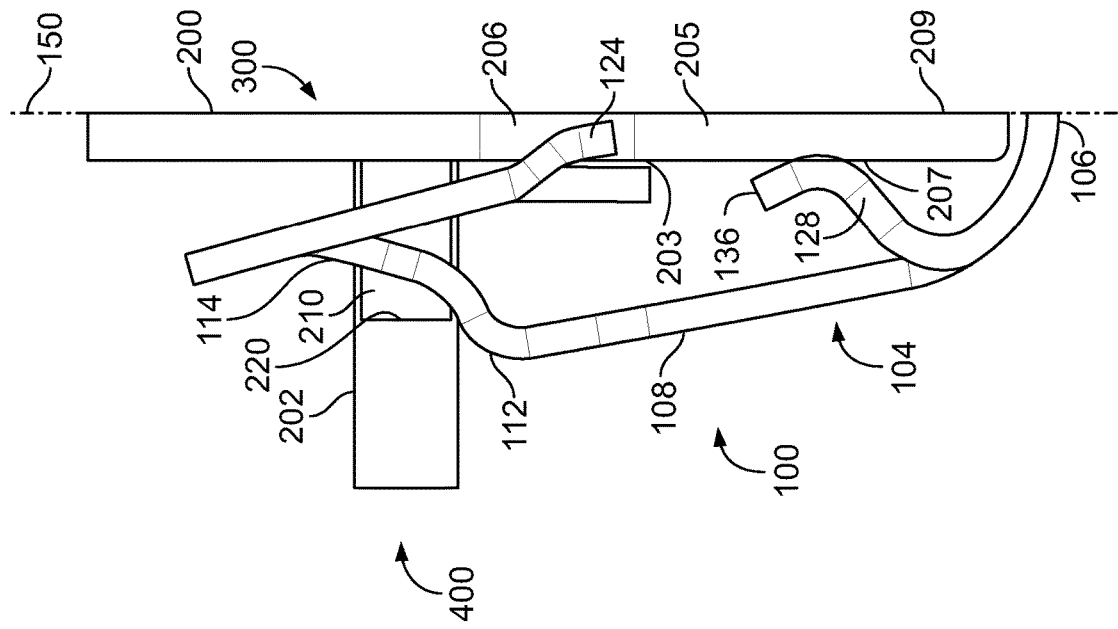
FIG. 9 illustrates a partial lateral view of a fastening clip secured to a first component and a second component, according to an embodiment of the present disclosure.

FIG. 9 illustrates a partial lateral view of the fastening clip 100 secured to the first component 200 and the second component 202, according to an embodiment of the present disclosure. FIG. 9 only shows one side of the fastening clip 100. In particular, only one frame 104 is shown in FIG. 9.

Referring to FIGS. 1-9, the internal edges 220 of the opening 210 of the second component 202 exert a compressive force into the tab 114 proximate the bend 112, thereby compressing the opposed frames 104 toward one another resulting in a secure interference first between the sub-assembly 300 and the second component 202. The four inwardly-curved bends 112 of the fastening clip 100 securely and stably couple the sub-assembly 300 to the second component 202 at four distinct locations on an underside of the second component 202. The inward curvature of the four bends 112 increases retention force with the second component 202 without substantially increasing an insertion force of the fastening clip 100 in relation to the second component 202. Moreover, as the four bends 112 slide through the opening 210 and pass underneath the second component 202, the opposed frames 104 outwardly expand and securely couple underneath the second component 202, which may generate an audible snap that indicates a fully formed assembly 400.

The angle of each leg 108 relative to the central longitudinal plane 150 of the fastening clip 100 may be less than forty-five degrees. In at least one embodiment, the legs 108 may be oriented relative to the central longitudinal plane 150 at an angle between twenty and thirty degrees. In this manner, the legs 108 are oriented at a relatively shallow angle in relation to the central longitudinal plane 150, which allows for ergonomically efficient insertion, while providing a secure retaining force. Optionally, the angle may be less than twenty degrees or greater than thirty degrees.

The outwardly-flared end tabs 136 of the opposed prongs 128 ensure that the prongs 128 do not snag the first component 200 as the fastening clip 100 is coupled thereto. Moreover, the outwardly-flared end tabs 136 increase an axial alignment tolerance so that the first component 200 may be guided into a secure coupling with the fastening clip 100 without the need for a specific and particular insertion angle between the fastening clip 100 and the first component 200. As such, the installation process is relatively quick and easy.

As shown, the second contact fingers 124 may extend into the opening 206 of the first component 200 (on opposite sides) without abutting one another, while the first contact fingers 122 may overlay opposite outer portions of the first component 200 around the opening 206. As such, the interior second contact fingers 124 within the opening 206 resist extraction of the first component 200 relative to the fastening clip 100, while the exterior first contact fingers 122 overlay outer portions of the first component 200 to maintain lateral orientation during axial and uneven loading.

The fastening clip securely couples to the first component 200 and the second component 202 to form the assembly 400. As described above, the fastening clip 100 includes the first frame 104a connected to the opposed second frame 104b by the arcuate transition beam 106. Each of the first and second frames 104a and 104b includes: an exterior contact finger 122 that is configured to securely abut into a first outer surface 203 (or 205) of the first component 200 around at least a portion of the first opening 206 formed through the first component 200; an interior contact finger 124 that is configured to extend into the first opening 206; and a contact prong 128 that is configured to abut into a second outer surface 207 (or 209) of the first component 200.

Embodiments of the present disclosure provide a fastening clip 100 that securely and efficiently connects to one or more components. Embodiments of the present disclosure provide a fastening clip 100 that is able to resist extraction without undesirably affecting a component.

The fastening clip 100 provides improved retention and serviceability as compared to various known clip fasteners. The fastening clip 100 is able to withstand multiple installations and extractions without excessive deformation of the fastening clip 100 and the assembly 400. The fastening clip 100 exhibits improved performance as compared to various known clip fasteners. The fastening clip 100 limits deformation of the rectangular openings 206 and 210 of the first and second components 200 and 202 during installation and extraction. Further, the fastening clip 100 maintains structural integrity during angled loading and extraction, in contrast to certain known clip fasteners that are susceptible to dislodging from a structure.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

Variations and modifications of the foregoing are within the scope of the present disclosure. It is understood that the embodiments disclosed and defined herein extend to all alternative combinations of two or more of the individual features mentioned or evident from the text and/or drawings. All of these different combinations constitute various alternative aspects of the present disclosure. The embodiments described herein explain the best modes known for practicing the disclosure and will enable others skilled in the art to utilize the disclosure. The claims are to be construed to include alternative embodiments to the extent permitted by the prior art.

To the extent used in the appended claims, the terms "including" and "in which" are used as the plain-English equivalents of the respective terms "comprising" and "wherein. Moreover, to the extent used in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

Various features of the disclosure are set forth in the following claims.

The invention claimed is:

1. A fastening clip that is configured to securely connect a first component to a second component, the fastening clip comprising:
   a first frame connected to an opposed second frame by an arcuate transition beam, wherein at least one of the first and second frames comprises:
   an exterior contact finger disposed between the first and second frames and extending away from a central longitudinal plane of the fastening clip, wherein the exterior contact finger is configured to securely abut into a first location upon the outer surface of the first component around at least a portion of a first opening formed through the first component;
   an interior contact finger disposed between the first and second frames and extending toward the central longitudinal plane, wherein the interior contact finger is configured to extend into the first opening; and a contact member that is configured to abut into a second location upon the outer surface of the first component,
   wherein each of the first and second frames further comprises lateral legs that outwardly and upwardly flare from the transition beam, wherein each of the exterior contact finger, the interior contact finger, and the contact member are between the lateral legs.

2. The fastening clip of claim 1, wherein the fastening clip is configured to securely couple to the first component to form a sub-assembly, and wherein the sub-assembly is configured to be securely coupled to the second component to form an assembly.

3. The fastening clip of claim 1, wherein the fastening clip is made of metal.

4. The fastening clip of claim 1, wherein each of the first and second frames further comprises an arcuate bend connected to a coupling tab, wherein the arcuate bend inwardly directs the coupling tab towards a central longitudinal plane of the fastening clip.

5. The fastening clip of claim 4, wherein the coupling tab comprises an outwardly-flared end.

6. The fastening clip of claim 4, wherein the at least one of the first and second frames further comprises a central beam extending from the coupling tab, and wherein the exterior and interior contact fingers extend from the central beam.

7. The fastening clip of claim 1, wherein the exterior contact finger is split away from the interior contact finger.

8. The fastening clip of claim 1, wherein the exterior contact finger and the interior contact finger of the first frame are inverted with respect to the exterior contact finger and the interior contact finger of the second frame.

9. The fastening clip of claim 7, wherein the contact member comprises an outwardly-flared end tab.

10. A fastening clip that is configured to securely connect a first component to a second component, the fastening clip comprising:
    a first frame connected to an opposed second frame by an arcuate transition beam, wherein each of the first and second frames comprises:
    an exterior contact finger disposed between the first and second frames and extending away from a central longitudinal plane of the fastening clip, wherein the exterior contact finger is configured to securely abut into a first location upon the outer surface of the first component around at least a portion of a first opening formed through the first component; and
    an interior contact finger disposed between the first and second frames and extending toward the central longitudinal plane, wherein the interior contact finger is configured to extend into the first opening;
    wherein each of the first and second frames further comprises lateral legs that outwardly and upwardly flare from the transition beam, wherein each of the exterior contact fingers and the interior contact fingers is between the lateral legs.

11. The fastening clip of claim 10, wherein each of the first and second frames further comprises a contact member that is configured to abut into a second location upon the outer surface of the first component.

12. The fastening clip of claim 10, wherein each exterior contact finger of each of the first and second frames is split away from the interior contact finger.

13. The fastening clip of claim 10, wherein the exterior contact finger and the interior contact finger of the first frame are inverted with respect to the exterior contact finger and the interior contact finger of the second frame.

14. The fastening clip of claim 10, wherein the fastening clip is metal.

15. A fastening clip that is configured to securely connect a first component to a second component, the fastening clip comprising:
    a first frame connected to an opposed second frame by an arcuate transition beam,
    wherein at least one of the first and second frames comprises
    an exterior contact finger disposed between the first and second frames and extending away from a central longitudinal plane of the fastening clip, wherein the exterior contact finger is configured to securely abut into a first location upon the outer surface of the first component around at least a portion of a first opening formed through the first component; and
    an interior contact finger disposed between the first and second frames and extending toward the central longitudinal plane, wherein the interior contact finger is configured to extend into the first opening,
    wherein each of the first and second frames comprises a contact member that is configured to abut into a second location upon the outer surface of the first component, and
    wherein each of the first and second frames further comprises lateral legs that outwardly and upwardly flare from the transition beam, wherein each of the exterior contact finger, the interior contact finger, and the contact members is between the lateral legs.

16. The fastening clip of claim 15, wherein the contact member of the first frame mirrors the contact member of the second frame.

17. The fastening clip of claim 15, wherein the exterior contact finger is split away from the interior contact finger.

18. The fastening clip of claim 15, wherein the fastening clip is metal.

19. The fastening clip of claim 15, wherein at least one of the contact members comprises an outwardly-flared end tab.

* * * * *